US012632234B2

(12) United States Patent
Ishizaki

(10) Patent No.: US 12,632,234 B2
(45) Date of Patent: May 19, 2026

(54) AUTOMATICALLY REPLACING CODE IN PROGRAM THAT MANIPULATES TWO VECTORS OF DATA TO IMPROVE EXECUTION TIME

(71) Applicant: International Business Machines Corporation, Armonk, NY (US)

(72) Inventor: Kazuaki Ishizaki, Kotoh (JP)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 17/948,425

(22) Filed: Sep. 20, 2022

(65) Prior Publication Data

US 2024/0094999 A1 Mar. 21, 2024

(51) Int. Cl.
G06F 9/445 (2018.01)
G06F 8/41 (2018.01)
G06F 9/38 (2018.01)

(52) U.S. Cl.
CPC .......... G06F 8/4441 (2013.01); G06F 9/3887 (2013.01)

(58) Field of Classification Search
CPC .......... G03F 1/78; G06F 3/0619; G06F 21/32; G06F 30/398; G06F 40/40; G06F 16/532; G06F 40/205; G06F 8/4441; G06F 9/3887
See application file for complete search history.

(56) References Cited

U.S. PATENT DOCUMENTS

| | | | | |
|---|---|---|---|---|
| 4,151,512 A | * | 4/1979 | Riganati | ................. G06F 21/32 |
| | | | | 382/125 |
| 7,698,534 B2 | | 4/2010 | Perfetta et al. | |
| 8,132,150 B2 | | 3/2012 | De Sutter et al. | |
| 8,966,461 B2 | | 2/2015 | Gaster et al. | |
| 2006/0134532 A1 | * | 6/2006 | Ogawa | ...................... G03F 1/78 |
| | | | | 430/394 |
| 2008/0082567 A1 | | 4/2008 | Bezanson | |

OTHER PUBLICATIONS

No Author, "Class Vector<E>", https://web.archive.org/web/20220814225342/https://docs.oracle.com/en/java/javase/16/docs/api/jdk.incubator.vector/jdk/incubator/vector/Vector.html, Aug. 14, 2022, 64 pages.

* cited by examiner

*Primary Examiner* — Chuck O Kendall
(74) *Attorney, Agent, or Firm* — Scott Dobson

(57) ABSTRACT
A computer-implemented method, system and computer program product for improving the performance of a program that manipulates two vectors of data. It is determined whether the program contains one of the following patterns: a first pattern corresponding to v0.rearrange(s, v1); a second pattern corresponding to v0.blend(v1, m); and a third pattern corresponding to v0.rearrange(s).blend(v1.rearrange(s), m). Upon identifying code written as the first pattern in the program, the first pattern is rewritten and replaced with the second or third pattern if the execution time of the program with the second or third pattern is less than the execution time of the program with the first program. In a similar manner, upon identifying code written as the second or third pattern in the program, the second or third pattern is rewritten and replaced with the first pattern if the execution time of the program can be improved.

20 Claims, 8 Drawing Sheets

201~ PATTERN IDENTIFIER

202~ CODE TRANSFORMATION ENGINE

203~ EVALUATOR

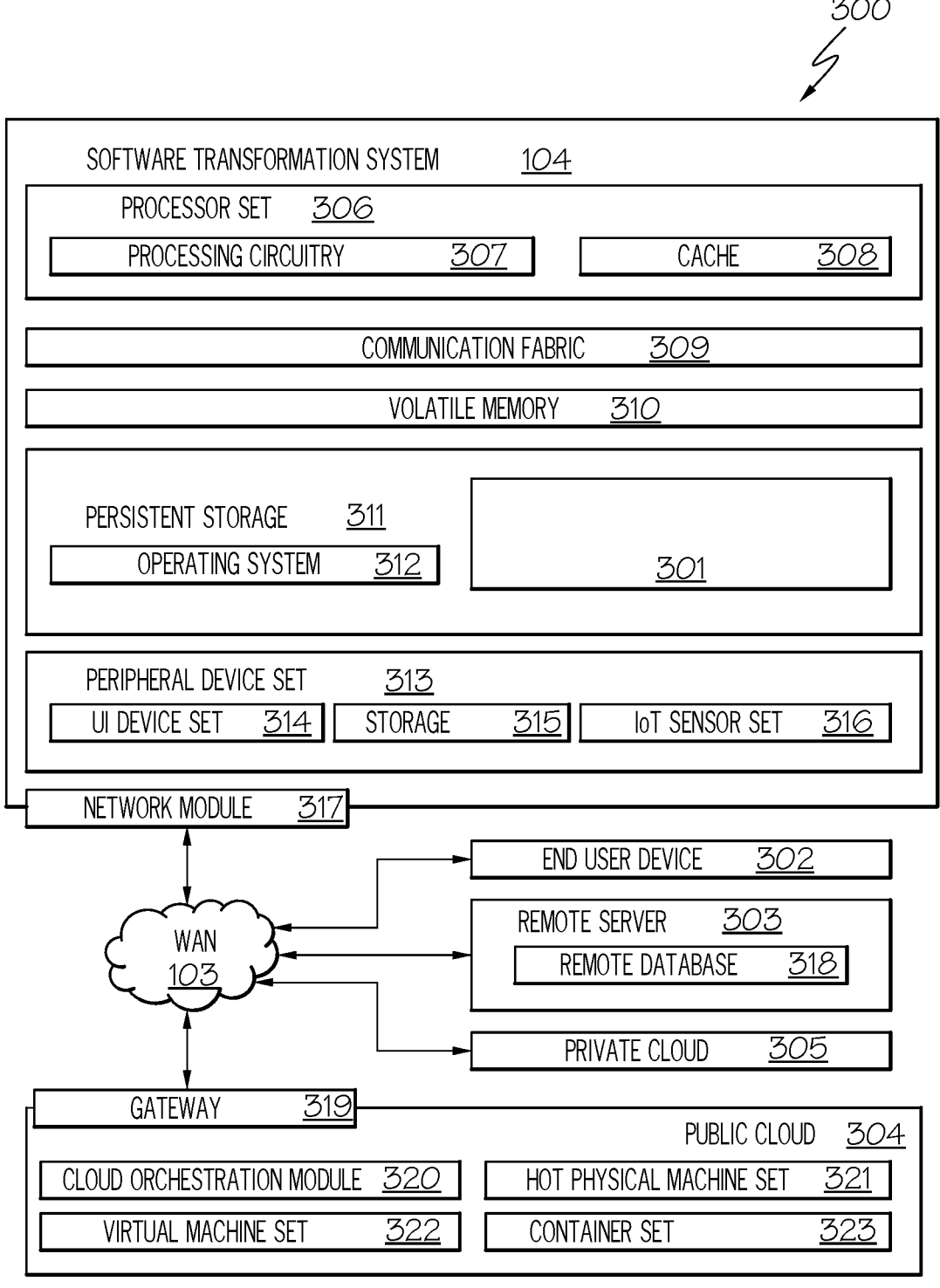

*300*

SOFTWARE TRANSFORMATION SYSTEM    *104*

PROCESSOR SET    *306*

PROCESSING CIRCUITRY    *307*    CACHE    *308*

COMMUNICATION FABRIC    *309*

VOLATILE MEMORY    *310*

PERSISTENT STORAGE    *311*

OPERATING SYSTEM    *312*    *301*

PERIPHERAL DEVICE SET    *313*

UI DEVICE SET    *314*    STORAGE    *315*    IoT SENSOR SET    *316*

NETWORK MODULE    *317*

WAN
*103*

END USER DEVICE    *302*

REMOTE SERVER    *303*

REMOTE DATABASE    *318*

PRIVATE CLOUD    *305*

GATEWAY    *319*

PUBLIC CLOUD    *304*

CLOUD ORCHESTRATION MODULE    *320*    HOT PHYSICAL MACHINE SET    *321*

VIRTUAL MACHINE SET    *322*    CONTAINER SET    *323*

FIG. 3

AUTOMATICALLY REPLACING CODE IN PROGRAM THAT MANIPULATES TWO VECTORS OF DATA TO IMPROVE EXECUTION TIME

TECHNICAL FIELD

The present disclosure relates generally to software code development, and more particularly to improving the execution time of manipulating vector data using Java® Vector API by automatically replacing code in a program (e.g., written using Java® Vector API) that manipulates two vectors of data if the execution time of the program can be improved.

BACKGROUND

Software development is the process of conceiving, specifying, designing, programming, documenting, testing, and bug fixing involved in creating and maintaining applications, frameworks, or other software components. Software development involves writing and maintaining the source code by software developers (users performing software development), but in a broader sense, it includes all processes from the conception of the desired software through to the final manifestation of the software, typically in a planned and structured process. Software development also includes research, new development, prototyping, modification, reuse, re-engineering, maintenance, or any other activities that result in software products.

SUMMARY

In one embodiment of the present disclosure, a computer-implemented method for improving performance of a program that manipulates two vectors of data comprises determining whether a program contains one of the following patterns: a first pattern corresponding to v0.rearrange(s, v1); a second pattern corresponding to v0.blend(v1, m); and a third pattern corresponding to v0.rearrange(s).blend (v1.rearrange(s), m), where the v0 and v1 are vectors, where the s is a structure that holds integer values indicating a destination position of each lane of a vector, where the m is a structure that holds Boolean values used to select each lane of a vector, where the rearrange( ) method moves values in a location of a vector lane based on a numerical value given as an argument, and where the blend( ) method selects values in a vector lane based on a Boolean value given as an argument. The method further comprises rewriting the first pattern in the program to one of the second and third patterns in response to identifying code written as the first pattern in the program. The method additionally comprises replacing the first pattern of the program with one of the second and third patterns in response to an execution time of the program written with one of the second and third patterns being less than an execution time of the program written with the first pattern.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 3 illustrates an embodiment of the present disclosure of the hardware configuration of the software transformation system which is representative of a hardware environment for practicing the present disclosure;

DETAILED DESCRIPTION

Figure 1:
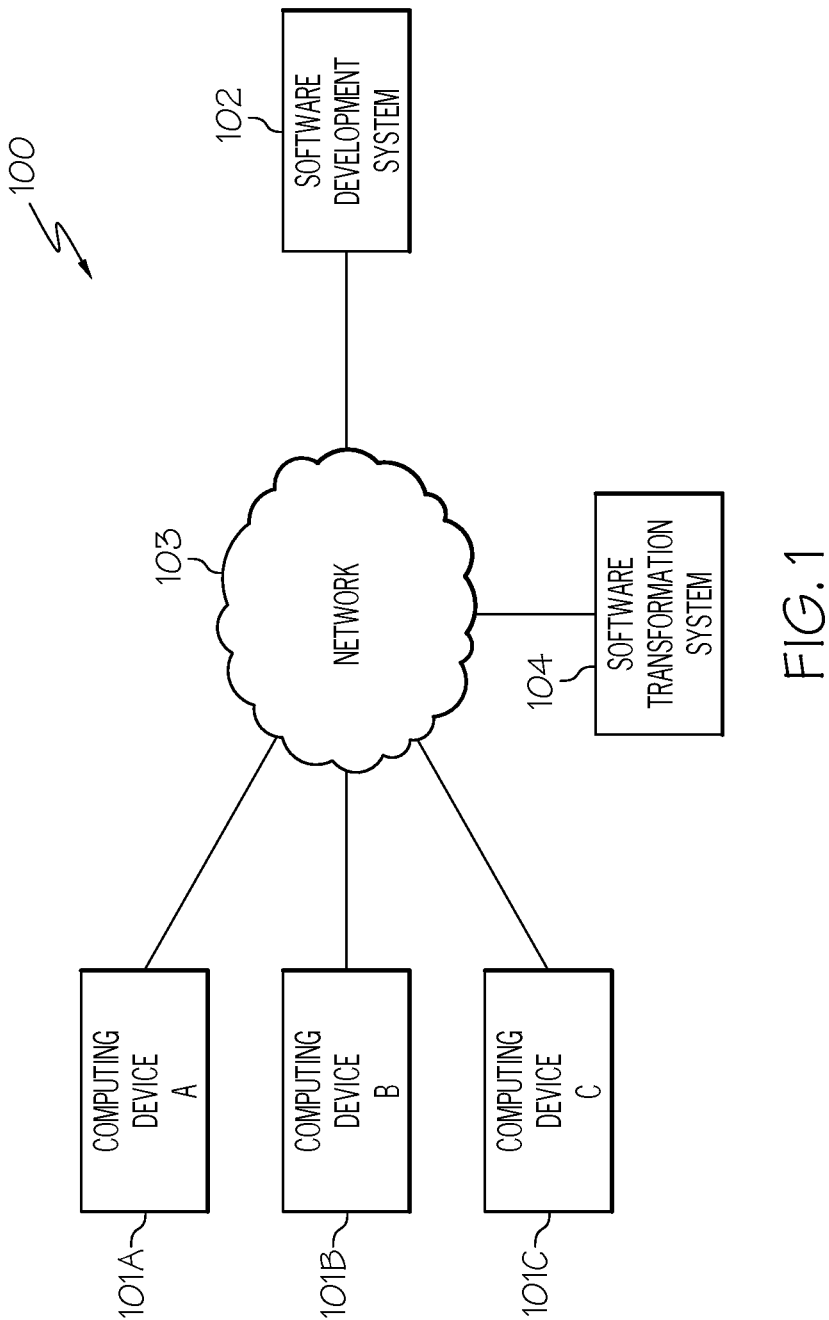
FIG. 1 illustrates a communication system for practicing the principles of the present disclosure in accordance with an embodiment of the present disclosure.

As stated in the Background section, software development is the process of conceiving, specifying, designing, programming, documenting, testing, and bug fixing involved in creating and maintaining applications, frameworks, or other software components. Software development involves writing and maintaining the source code by software developers (users performing software development), but in a broader sense, it includes all processes from the conception of the desired software through to the final manifestation of the software, typically in a planned and structured process. Software development also includes research, new development, prototyping, modification, reuse, re-engineering, maintenance, or any other activities that result in software products.

The Java® programming language used by software programmers (coding professionals) and software developers (writes, manages and debugs the code in computer programs) for software development has recently introduced the Java® Vector API. The Java® Vector API provides an abstraction layer to data-parallel capabilities of modern CPUs. The Vector API tries to enable software developers to write data-parallel software in a very platform-agnostic way.

In contrast to a regular computing operation, as in 1+1 where two "pieces of data" are added in one operation, a data-parallel operation is executing a simple operation (e.g., +) on multiple "pieces of data" at the same time. This mode of operation is called single instruction, multiple data (SIMD), whereas, the traditional way of execution is called single instruction, single data (SISD). The performance speed-up results from applying the same operation on more than one "piece of data" within one CPU cycle. As a simple example, instead of adding each element of an array A with each element of an array B, chunks of array A and array B may be operated simultaneously.

Unfortunately, when software programmers or software developers write programs using Vector API, the expected performance may not be achieved.

For example, when manipulating vector data, such as moving data across lane boundaries, a slow execution time may result. For instance, a vector is divided into lanes and each lane contains a data value called an element. The rearrange( ) family of methods in Java® selects an arbitrary set of VLENGTH (length of vector) lanes from the input vector(s) and assembles them in an arbitrary order. However, the use of the rearrange( ) method to move data across lane boundaries may result in a slow execution time of the program.

Unfortunately, there is not currently a means for improving the execution time of programs manipulating vector data using Java® Vector API, such as programs using the rearrange( ) method to move data across lane boundaries.

The embodiments of the present disclosure provide a means for improving the execution time of the program manipulating vector data using Java® Vector API by automatically replacing a particular pattern(s) of code in the program if the execution time of the program can be improved. In one embodiment, such an execution time may be improved by utilizing the rearrange( ) method, which is used to move values in a location of a vector lane based on a numerical value given as an argument, and the blend( ) method, which is used to select the values in the vector lane based on the Boolean value provided as an argument. A more detailed description of these and other features is provided further below.

In some embodiments of the present disclosure, the present disclosure comprises a computer-implemented method, system and computer program product for improving the performance of a program that manipulates two vectors of data. In one embodiment of the present disclosure, it is determined whether the program contains one of the following patterns: a first pattern corresponding to v0.rearrange (s, v1); a second pattern corresponding to v0.blend(v1, m); and a third pattern corresponding to v0.rearrange(s).blend (v1.rearrange(s), m), where v0 and v1 are vectors, where s is a structure that holds integer values indicating a destination position of each lane of a vector, and where m is a structure that holds Boolean values used to select each lane of a vector. Furthermore, the rearrange( ) method is used to move values in a location of a vector lane based on a numerical value given as an argument. Additionally, the blend( ) method is used to select the values in the vector lane based on the Boolean value provided as an argument. Upon identifying code written as the first pattern in the program, the first pattern is rewritten as the second or third pattern. The first pattern of the program is then replaced with the second or third pattern if the execution time of the program with the second or third pattern is less than the execution time of the program with the first program. Furthermore, upon identifying code written as the second pattern in the program, the second pattern is rewritten as the first pattern. The second pattern of the program is then replaced with the first pattern if the execution time of the program with the first pattern is less than the execution time of the program with the second program. Additionally, upon identifying code written as the third pattern in the program, the third pattern is rewritten as the first pattern. The third pattern of the program is then replaced with the first pattern if the execution time of the program with the first pattern is less than the execution time of the program with the third program. In this manner, the performance of a program that manipulates vector data using Java® Vector API is improved by automatically replacing a pattern(s) of code in the program (e.g., utilize the blend( ) method as opposed to the rearrange( ) method) if such a replacement would improve the execution time of the program.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a software development system 102 via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and software development system 102. It is noted that both computing device 101 and the user of computing device 101 may be identified with element number 101.

Software development system 102 is a system utilized, such as by software programmers and software developers (e.g., users of computing devices 101), in the process of creating, designing, deploying and supporting software. Examples of such software development systems include, but not limited to, RAD Studio®, Embold®, Collaborator®, Studio 3T®, NetBeans®, Zend Studio®, Microsoft® Expression Studio, etc.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 further includes a software transformation system 104 interconnected with computing devices 101 and software development system 102 via network 103. In one embodiment, software transformation system 104 is configured to improve the execution time of a program manipulating vector data using Java® Vector API by automatically replacing a particular pattern(s) of code in the program if the execution time of the program can be improved. In one embodiment, software transformation system 104 identifies various patterns of code in the program, such as patterns corresponding to: (1) v0.rearrange(s, v1); (2) v0.blend(v1, m); and (3) v0.rearrange(s).blend(v1.rearrange(s), m), where v0 and v1 are vectors that contain values formed from executing single instruction, multiple data (SIMD) instructions, where s is a structure that holds integer values indicating a destination position of each lane of a vector, and where m is a structure that holds Boolean values used to select each lane of a vector. Furthermore, the rearrange( ) method in Java® moves the values in the location of the vector lane based on the numerical value given as an argument. Additionally, the blend( ) method in Java® selects the values in the vector lane based on the Boolean value given as an argument.

In one embodiment, upon identifying the first pattern (v0.rearrange(s, v1)) in a program used to manipulate two vectors of data, software transformation system 104 transforms or rewrites the first pattern as a second pattern (v0.blend(v1, m) or a third pattern (v0.rearrange(s).blend (v1.rearrange(s), m) and determines whether the execution time of the program with the rewritten second/third pattern is less than the execution time of the program with the first pattern. If the execution time of the program with the rewritten second/third pattern is less than the execution time of the program with the first pattern, then system transformation system 104 replaces the first pattern with the second/ third pattern in the program thereby improving the performance of the program that manipulates two vectors of data using Java® Vector API by improving the execution time of the program.

In one embodiment, upon identifying the second pattern (v0.blend(v1, m)) in the program used to manipulate two vectors of data, software transformation system 104 transforms or rewrites the second pattern as the first pattern (v0.rearrange(s, v1)) and determines whether the execution time of the program with the rewritten first pattern is less than the execution time of the program with the second pattern. If the execution time of the program with the rewritten first pattern is less than the execution time of the program with the second pattern, then system transformation system 104 replaces the second pattern with the first pattern in the program thereby improving the performance of the program that manipulates two vectors of data using Java® Vector API by improving the execution time of the program.

In one embodiment, upon identifying the third pattern (v0.rearrange(s).blend(v1.rearrange(s), m)) in the program used to manipulate two vectors of data, software transformation system 104 transforms or rewrites the third pattern as the first pattern (v0.rearrange(s, v1)) and determines whether the execution time of the program with the rewritten first pattern is less than the execution time of the program with the third pattern. If the execution time of the program with the rewritten first pattern is less than the execution time of the program with the third pattern, then system transformation system 104 replaces the third pattern with the first pattern in the program thereby improving the performance of the program that manipulates two vectors of data using Java® Vector API by improving the execution time of the program.

These and other features will be discussed in further detail below.

A description of the software components of software transformation system 104 used for improving the execution time of the program manipulating vector data using Java® Vector API is provided below in connection with FIG. 2. A description of the hardware configuration of software transformation system 104 is provided further below in connection with FIG. 3.

System 100 is not to be limited in scope to any one particular network architecture. System 100 may include any number of computing devices 101, software development systems 102, networks 103 and software transformation systems 104.

A discussion regarding the software components used by software transformation system 104 to improve the execution time of the program manipulating vector data using Java® Vector API is provided below in connection with FIG. 2

Figure 2:
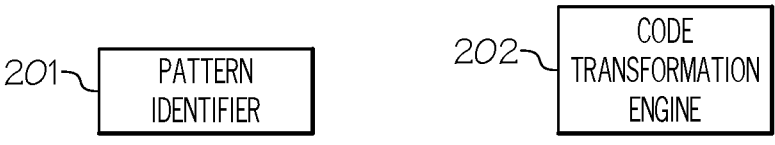
FIG. 2 is a diagram of the software components used by the software transformation system to improve the execution time of the program manipulating vector data using Java® Vector API in accordance with an embodiment of the present disclosure.

FIG. 2 is a diagram of the software components used by software transformation system 104 (FIG. 1) to improve the execution time of the program manipulating vector data using Java® Vector API in accordance with an embodiment of the present disclosure.

Referring to FIG. 2, in conjunction with FIG. 1, software transformation system 104 includes a pattern identifier 201 configured to identify various patterns of code in a program, such as a program that manipulates two vectors of data using Java® Vector API.

In one embodiment, pattern identifier 201 is configured to identify the following three patterns of code in the program, such as a program that manipulates two vectors of data using Java® Vector API. The first pattern corresponds to v0.rearrange(s, v1), the second pattern corresponds to v0.blend(v1, m), and the third pattern corresponds to v0.rearrange(s).blend(v1.rearrange(s), m), where v0 and v1 are vectors that contain values formed from executing single instruction, multiple data (SIMD) instructions, where s is a structure that holds integer values indicating a destination position of each lane of a vector, and where m is a structure that holds Boolean values used to select each lane of a vector. Furthermore, the rearrange( ) method in Java® moves the values in the location of the vector lane based on the numerical value given as an argument. Additionally, the blend( ) method in Java® selects the values in the vector lane based on the Boolean value given as an argument.

In one embodiment, v0 and v1 are objects of the Vector class of the jdk.incubator.vector package (package that provides classes to express vector computations that are accelerated using vector hardware instructions).

In one embodiment, s is an object of the VectorShuffle class of the jdk.incubator.vector package.

In one embodiment, m is an object of the VectorMask class of the jdk.incubator.vector package.

In one embodiment, such patterns, including the methods (e.g., rearrange( ), blend( )) and objects (e.g., v0, v1, s, m) of the classes to be identified in such patterns, are populated in a data structure by an expert and used by pattern identifier 201 to locate such patterns in the program (e.g., program for manipulating two vectors of data using Java® Vector API). In one embodiment, such a data structure is stored in a storage device (e.g., memory, disk unit) of software transformation system 104.

In one embodiment, such patterns of code (e.g., v0.rearrange(s, v1); v0.blend(v1, m); v0.rearrange(s).blend (v1.rearrange(s), m)), including the methods and objects of the classes in such patterns, are identified in the program (e.g., program for manipulating two vectors of data using Java® Vector API) using various software tools, including, but not limited to, Whole Platform, Coccinelle, AdaControl, Spoon, etc.

In one embodiment, upon identifying code in the program written as the first pattern (e.g., v0.rearrange(s, v1)) by pattern identifier 201, code transformation engine 202 of software transformation system 104 determines if it is possible to rewrite the first pattern as the second pattern (e.g., v0.blend(v1, m). If so, then code transformation engine 202 rewrites the first pattern as the second pattern as discussed in further detail below in connection with FIGS. 4A-4D. Upon rewriting the first pattern as the second pattern in the program, an evaluator 203 of software transformation system 104 computes the execution time of the program using the first pattern as well as computes the execution time of the program using the second pattern. If the execution time of the program using the second pattern is less than the execution time of the program using the first pattern, then code transformation engine 202 replaces the first pattern with the second pattern in the program thereby improving the performance of the program that manipulates two vectors of data using Java® Vector API by improving the execution time of the program.

In one embodiment, code transformation engine 202 rewrites the first pattern as the second pattern in the program using rules that associates the first pattern with the second pattern. For example, a rule may be implemented that rewrites the first pattern as the second pattern using the steps discussed below in connection with FIGS. 4A-4D.

In one embodiment, code transformation engine 202 rewrites the first pattern as the second pattern in the program using various software tools, including, but not limited to, Coccinelle, Spoon, DMS® Software Reengineering Toolkit™, etc.

As discussed above, in one embodiment, upon identifying code in the program written as the first pattern (e.g., v0.rearrange(s, v1)) by pattern identifier 201, code transformation engine 202 of software transformation system 104 determines if it is possible to rewrite the first pattern as the second pattern (e.g., v0.blend(v1, m). If is not possible to rewrite the first pattern as the second pattern, then, in one embodiment, code transformation engine 202 determines if it is possible to rewrite the first pattern as the third pattern (e.g., v0.rearrange(s).blend(v1.rearrange(s), m)).

If so, then code transformation engine 202 rewrites the first pattern as the third pattern as discussed in further detail below in connection with FIGS. 4A-4D. Upon rewriting the first pattern as the third pattern in the program, an evaluator 203 of software transformation system 104 computes the execution time of the program using the first pattern as well as computes the execution time of the program using the third pattern. If the execution time of the program using the third pattern is less than the execution time of the program using the first pattern, then code transformation engine 202 replaces the first pattern with the third pattern in the program thereby improving the performance of the program that manipulates two vectors of data using Java® Vector API by improving the execution time of the program.

As in the case for rewriting the first pattern as the second pattern in the program, in one embodiment, code transformation engine 202 rewrites the first pattern as the third pattern in the program using rules that associates the first pattern with the third pattern. For example, a rule may be implemented that rewrites the first pattern as the third pattern using the steps discussed below in connection with FIGS. 4A-4D.

In one embodiment, code transformation engine 202 rewrites the first pattern as the third pattern in the program using various software tools, including, but not limited to, Coccinelle, Spoon, DMS® Software Reengineering Toolkit™, etc.

In one embodiment, upon identifying code in the program written as the second pattern (e.g., v0.blend(v1, m)) by pattern identifier 201, code transformation engine 202 of software transformation system 104 determines if it is possible to rewrite the second pattern as the first pattern (e.g., v0.rearrange(s, v1)). If so, then code transformation engine 202 rewrites the second pattern as the first pattern as discussed in further detail below in connection with FIGS. 4A-4D. Upon rewriting the second pattern as the first pattern in the program, evaluator 203 of software transformation system 104 computes the execution time of the program using the second pattern as well as computes the execution time of the program using the first pattern. If the execution time of the program using the first pattern is less than the execution time of the program using the second pattern, then code transformation engine 202 replaces the second pattern with the first pattern in the program thereby improving the performance of the program that manipulates two vectors of data using Java® Vector API by improving the execution time of the program.

In one embodiment, code transformation engine 202 rewrites the second pattern as the first pattern in the program using rules that associates the second pattern with the first pattern. For example, a rule may be implemented that rewrites the second pattern as the first pattern using the steps discussed below in connection with FIGS. 4A-4D.

In one embodiment, code transformation engine 202 rewrites the second pattern as the first pattern in the program using various software tools, including, but not limited to, Coccinelle, Spoon, DMS® Software Reengineering Toolkit™, etc.

In one embodiment, upon identifying code in the program written as the third pattern (e.g., v0.rearrange(s).blend (v1.rearrange(s), m)) by pattern identifier 201, code transformation engine 202 of software transformation system 104 determines if it is possible to rewrite the third pattern as the first pattern (e.g., v0.rearrange(s, v1)). If so, then code transformation engine 202 rewrites the third pattern as the first pattern as discussed in further detail below in connection with FIGS. 4A-4D. Upon rewriting the third pattern as the first pattern in the program, evaluator 203 of software transformation system 104 computes the execution time of the program using the third pattern as well as computes the execution time of the program using the first pattern. If the execution time of the program using the first pattern is less than the execution time of the program using the third pattern, then code transformation engine 202 replaces the third pattern with the first pattern in the program thereby improving the performance of the program that manipulates two vectors of data using Java® Vector API by improving the execution time of the program.

In one embodiment, code transformation engine 202 rewrites the third pattern as the first pattern in the program using rules that associates the third pattern with the first pattern. For example, a rule may be implemented that rewrites the third pattern as the first pattern using the steps discussed below in connection with FIGS. 4A-4D.

In one embodiment, code transformation engine 202 rewrites the third pattern as the first pattern in the program using various software tools, including, but not limited to, Coccinelle, Spoon, DMS® Software Reengineering Toolkit™, etc.

In one embodiment, evaluator 203 computes the execution time of the program using the two different patterns (e.g., first pattern and the second pattern) by measuring the program execution time from the program initiation, such as the presentation of inputs, to the termination at the delivery of the last outputs.

In one embodiment, evaluator 203 computes such an execution time using any of the following: the "time" Linux command, <chrono> library, gettimeofday( ) function, clock( ) function, timeit function in MathWorks®, stop-watch timer functions tic and toc in MathWorks®, etc.

In one embodiment, evaluator 203 uses software analyzers for computing the execution time, such as RapiTime, Dynatrace®, etc.

A further description of these and other functions is provided below in connection with the discussion of the method for improving the performance of a program (e.g., written using Java® Vector API) that manipulates two vectors of data.

Prior to the discussion of the method for improving the performance of a program (e.g., written using Java® Vector API) that manipulates two vectors of data, a description of the hardware configuration of software transformation system 104 (FIG. 1) is provided below in connection with FIG. 3.

Referring now to FIG. 3, in conjunction with FIG. 1, FIG. 3 illustrates an embodiment of the present disclosure of the hardware configuration of software transformation system 104 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code 301 involved in performing the inventive methods, such as improving the performance of the program that manipulates two vectors of data using Java® Vector API. In addition to block 301, computing environment 300 includes, for example, software transformation system 104, network 103, such as a wide area network (WAN), end user device (EUD) 302, remote server 303, public cloud 304, and private cloud 305. In this embodiment, software transformation system 104 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Software transformation system 104 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically software transformation system 104, to keep the presentation as simple as possible. Software transformation system 104 may be located in a cloud, even though it is not shown in a cloud in FIG. 3. On the other hand, software transformation system 104 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto software transformation system 104 to cause a series of operational steps to be performed by processor set 306 of software transformation system 104 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 308 and the other storage media discussed below. The program instructions, and associated data, are accessed by processor set 306 to control and direct performance of the inventive methods. In computing environment 300, at least some of the instructions for performing the inventive methods may be stored in block 301 in persistent storage 311.

Communication fabric 309 is the signal conduction paths that allow the various components of software transformation system 104 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In software transformation system 104, the volatile memory 310 is located in a single package and is internal to software transformation system 104, but, alternatively or additionally, the volatile memory may be distributed over multiple packages and/or located externally with respect to software transformation system 104.

Persistent Storage 311 is any form of non-volatile storage for computers that is now known or to be developed in the future. The non-volatility of this storage means that the stored data is maintained regardless of whether power is being supplied to software transformation system 104 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the inventive methods.

Peripheral device set 313 includes the set of peripheral devices of software transformation system 104. Data communication connections between the peripheral devices and the other components of software transformation system 104 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where software transformation system 104 is required to have a large amount of storage (for example, where software transformation system 104 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows software transformation system 104 to communicate with other computers through WAN 103. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the inventive methods can typically be downloaded to software transformation system 104 from an external computer or external storage device through a network adapter card or network interface included in network module 317.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates software transformation system 104), and may take any of the forms discussed above in connection with software transformation system 104. EUD 302 typically receives helpful and useful data from the operations of software transformation system 104. For example, in a hypothetical case where software transformation system 104 is designed to provide a recommendation to an end user, this recommendation would typically be communicated from network module 317 of software transformation system 104 through WAN 103 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to software transformation system 104. Remote server 303 may be controlled and used by the same entity that operates software transformation system 104. Remote server 303 represents the machine(s) that collect and store helpful and useful data for use by other computers, such as software transformation system 104. For example, in a hypothetical case where software transformation system 104 is designed and programmed to provide a recommendation based on historical data, then this historical data may be provided to software transformation system 104 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed above in connection with FIG. 2 to improve the performance of a program (e.g., written using Java® Vector API) that manipulates two vectors of data. In one embodiment, such components may be implemented in hardware. The functions discussed above performed by such components are not generic computer functions. As a result, software transformation system 104 is a particular machine that is the result of implementing specific, non-generic computer functions.

In one embodiment, the functionality of such software components of software transformation system 104, including the functionality for improving the performance of a program (e.g., written using Java® Vector API) that manipulates two vectors of data may be embodied in an application specific integrated circuit.

As stated above, the Java® programming language used by software programmers (coding professionals) and software developers (writes, manages and debugs the code in computer programs) for software development has recently introduced the Java® Vector API. The Java® Vector API provides an abstraction layer to data-parallel capabilities of modern CPUs. The Vector API tries to enable software developers to write data-parallel software in a very platform-agnostic way. In contrast to a regular computing operation, as in 1+1, where two "pieces of data" are added in one operation, a data-parallel operation is executing a simple operation (e.g., +) on multiple "pieces of data" at the same time. This mode of operation is called single instruction, multiple data (SIMD), whereas, the traditional way of execution is called single instruction, single data (SISD). The performance speed-up results from applying the same operation on more than one "piece of data" within one CPU cycle. As a simple example, instead of adding each element of an array A with each element of an array B, chunks of array A and array B may be operated simultaneously. Unfortunately, when software programmers or software developers write programs using Vector API, the expected performance may not be achieved. For example, when manipulating vector data, such as moving data across lane boundaries, a slow execution time may result. For instance, a vector is divided into lanes and each lane contains a data value called an element. The rearrange( ) family of methods in Java® selects an arbitrary set of VLENGTH (length of vector) lanes from the input vector(s) and assembles them in an arbitrary order. However, the use of the rearrange( ) method to move data across lane boundaries may result in a slow execution time of the program. Unfortunately, there is not currently a means for improving the execution time of programs manipulating vector data using Java® Vector API, such as programs using the rearrange( ) method to move data across lane boundaries.

Figure 5:
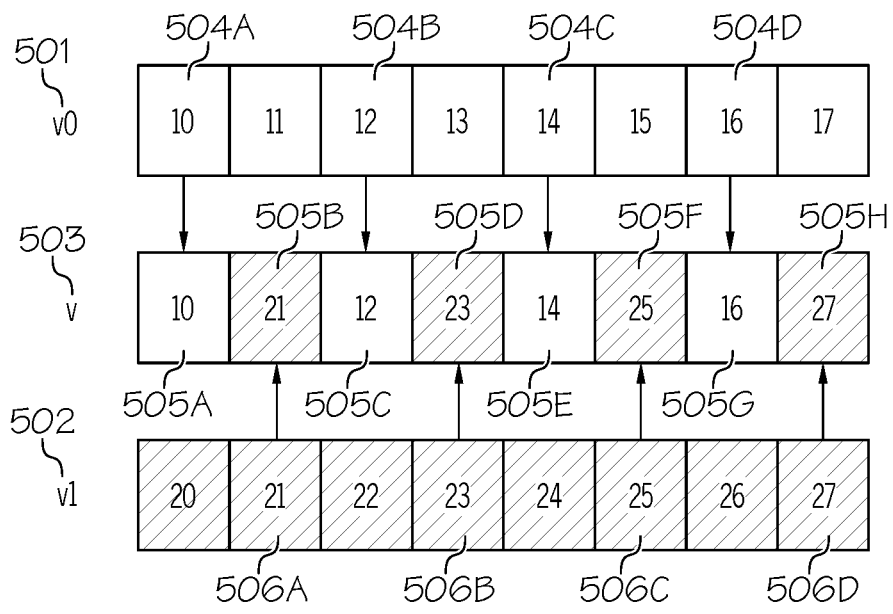
FIG. 5 illustrates the data in the vectors v0 and v1 being in the same lane position in the generated vector in accordance with an embodiment of the present disclosure.
Figure 6:
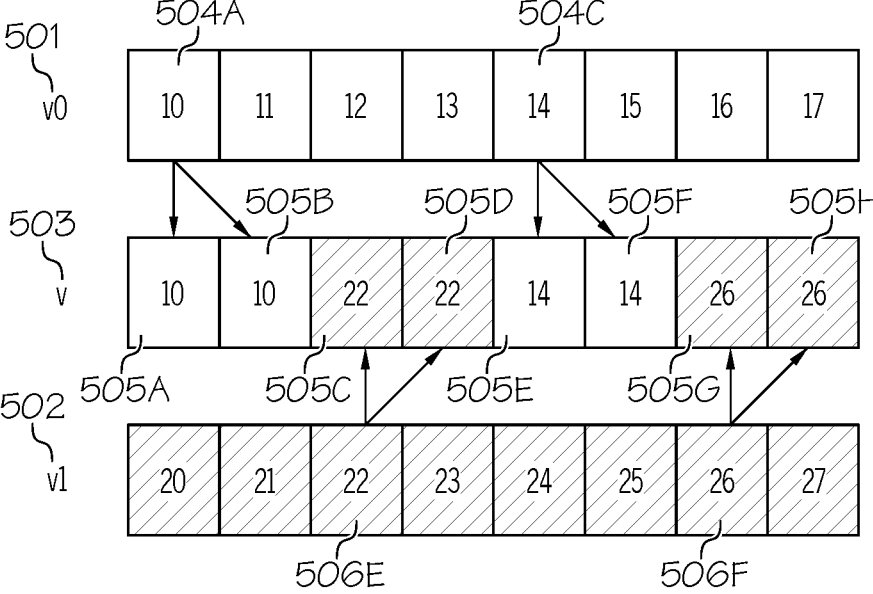
FIG. 6 illustrates the data in the vectors v0 and v1 being in a different lane position in the generated vector in accordance with an embodiment of the present disclosure.

The embodiments of the present disclosure provide a means for improving the execution time of the program manipulating vector data using Java® Vector API by automatically replacing a particular pattern(s) of code in the program if the execution time of the program can be improved as discussed below in connection with FIGS. 4A-4D and 5-6. FIG. 4A-4D are a flowchart of a method for improving the performance of a program that manipulates two vectors of data. FIG. 5 illustrates the data in the vectors v0 and v1 being in the same lane position in the generated vector. FIG. 6 illustrates the data in the vectors v0 and v1 being in a different lane position in the generated vector.

As stated above, FIGS. 4A-4D are a flowchart of a method 400 for improving the performance of a program (e.g., written using Java® Vector API) that manipulates two vectors of data in accordance with an embodiment of the present disclosure.

Figure 4A:
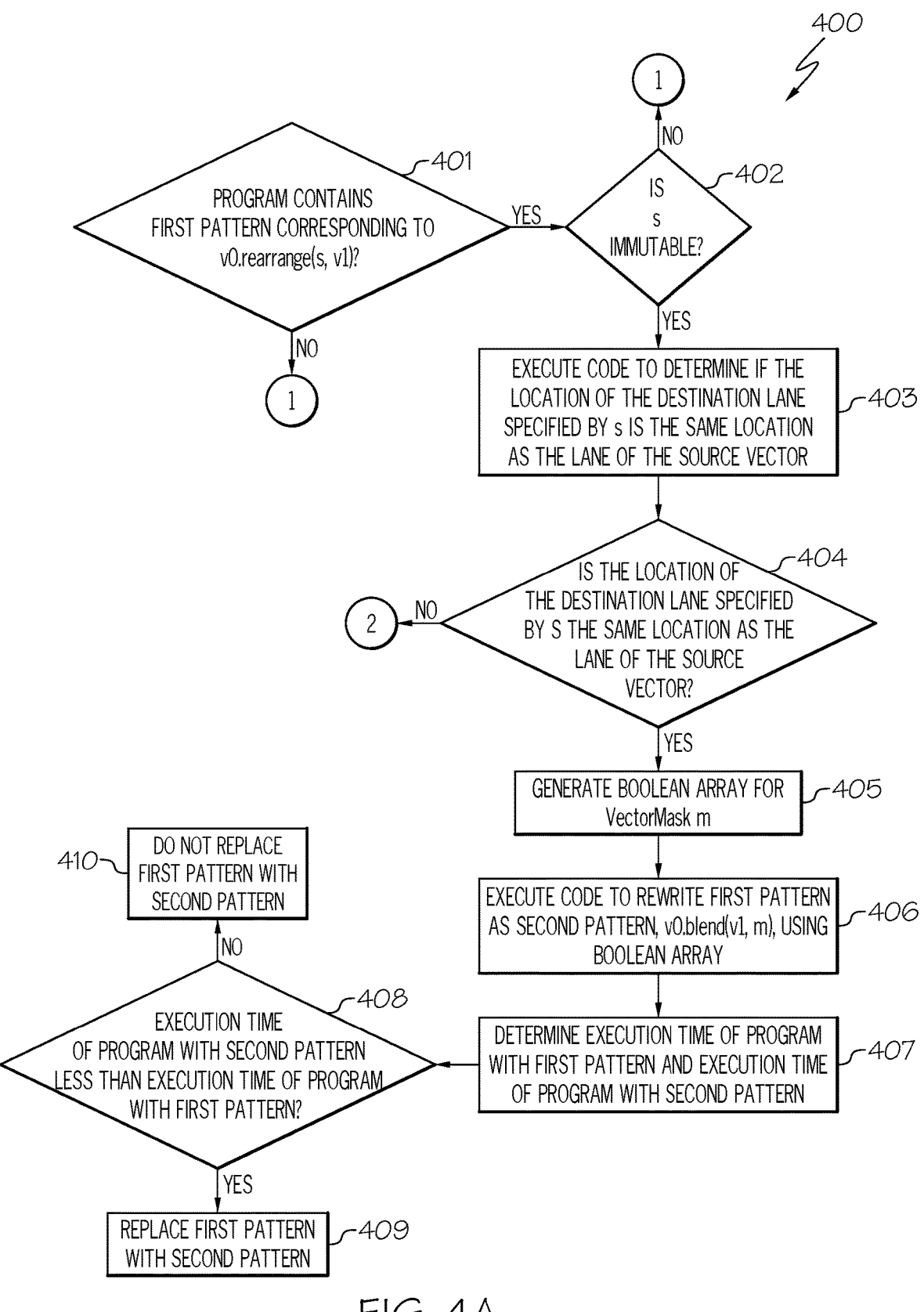
FIG. 4A-4D are a flowchart of a method for improving the performance of a program that manipulates two vectors of data in accordance with an embodiment of the present disclosure.

Referring now to FIG. 4A, in conjunction with FIGS. 1-3, in operation 401, pattern identifier 201 of software transformation system 104 determines if the program, such as a program that manipulates two vectors of data using Java® Vector API, contains a first pattern of code corresponding to v0.rearrange(s, v1), where v0 and v1 are vectors that contain values formed from executing single instruction, multiple data (SIMD) instructions, where s is a structure that holds integer values indicating a destination position of each lane of a vector, and where m is a structure that holds Boolean values used to select each lane of a vector. Furthermore, as discussed above, the rearrange( ) method moves the values in the location of the vector lane based on the numerical value given as an argument.

In one embodiment, v0 and v1 are objects of the Vector class of the jdk.incubator.vector package (package that provides classes to express vector computations that are accelerated using vector hardware instructions).

In one embodiment, s is an object of the VectorShuffle class of the jdk.incubator.vector package.

In one embodiment, m is an object of the VectorMask class of the jdk.incubator.vector package.

As discussed above, in one embodiment, such patterns, including the methods (e.g., rearrange( ), blend( )) and objects (e.g., v0, v1, s, m) of the classes to be identified in such patterns, are populated in a data structure by an expert and used by pattern identifier 201 to locate such patterns in the program (e.g., program for manipulating two vectors of data using Java® Vector API). In one embodiment, such a data structure is stored in a storage device (e.g., storage device 311, 315) of software transformation system 104.

In one embodiment, such a pattern of code (e.g., v0.rearrange(s, v1)), including the method and objects of the classes in such a pattern, are identified in the program (e.g., program for manipulating two vectors of data using Java® Vector API) using various software tools, including, but not limited to, Whole Platform, Coccinelle, AdaControl, Spoon, etc.

In one embodiment, upon identifying code in the program written as the first pattern (e.g., v0.rearrange(s, v1)) by pattern identifier 201, in operation 402, code transformation engine 202 of software transformation system 104 determines if s (structure that holds integer values indicating a destination position of each lane of a vector) is immutable (unchanging over time or unable to be changed).

If s is immutable, then, in operation 403, code transformation engine 202 of software transformation system 104 executes code to determine if the location of the destination lane specified by s is the same location as the lane of the source vector. As discussed above, a vector is divided into "lanes" and each lane contains a data value called an element. An illustrative pseudo code to perform such a function by code transformation engine 202 is provided below:

```
boolean isOnlyBlend(VectorShuffle s) {
    for (int i = 0; i < s.length( ); i++) {
        if (s.laneSource(i) + s.length( )) % s.length( ) != i) return false;
    }
    return true;
}
```

In operation 404, code transformation engine 202 of software transformation system 104 determines whether the location of the destination lane specified by s (structure that holds integer values indicating a destination position of each lane of a vector) is the same location as the lane of the source vector based on the code executed in operation 403.

For example, FIG. 5 illustrates the data in the vectors v0 and v1 being in the same lane position in the generated vector, such as a result of the rearrange( ) method, in accordance with an embodiment of the present disclosure.

As shown in FIG. 5, the data in vector v0 501 and the data in vector v1 502 are manipulated to form vector v 503, such as a LongVector type (specialized vector representing an ordered immutable sequence of long values). In particular, as shown in FIG. 5, the data in vector v0 501 and the data in vector v1 502 that are used to form vector v 503 reside in the same lane position as the lane position in vector v 503 storing the value from vector 501/502. For instance, the value (e.g., 10) in lane position 504A of vector 501 is stored in the same lane position 505A of vector 503. Similarly, the value (e.g., 21) in lane position 506A of vector 502 is stored in the same lane position 505B of vector 503. In another example, the value (e.g., 12) in lane position 504B of vector 501 is stored in the same lane position 505C of vector 503. In a further example, the value (e.g., 23) in lane position 506B of vector 502 is stored in the same lane position 505D of vector 503. In another example, the value (e.g., 14) in lane position 504C of vector 501 is stored in the same lane position 505E of vector 503. In a further example, the value (e.g., 25) in lane position 506C of vector 502 is stored in the same lane position 505F of vector 503. In another example, the value (e.g., 16) in lane position 504D of vector 501 is stored in the same lane position 505G of vector 503. In a further example, the value (e.g., 27) in lane position 506D of vector 502 is stored in the same lane position 505H of vector 503.

As a result, the first pattern of the program can be rewritten as the second pattern if the data in the vectors v0 and v1 are in the same lane position in the generated vector, such as via the result of the rearrange( ) method.

Alternatively, the location of the destination lane specified by s (structure that holds integer values indicating a destination position of each lane of a vector) may not be the same location as the lane of the source vector as shown in FIG. 6.

FIG. 6 illustrates the data in the vectors v0 and v1 not being in the same lane position in the generated vector, such as a result of the rearrange( ) method, in accordance with an embodiment of the present disclosure.

As shown in FIG. 6, the data in vector v0 501 and the data in vector v1 502 are manipulated to form vector v 503, such as a LongVector type (specialized vector representing an ordered immutable sequence of long values). In particular, as shown in FIG. 6, the data in vector v0 501 and the data in vector v1 502 that are used to form vector v 503 do not reside in the same lane position as the lane position in vector v 503 storing the value from vector 501/502. For instance, the value (e.g., 10) in lane position 504A of vector 501 is stored in lane positions 505A and 505B of vector 503. The value (e.g., 22) in lane position 506E of vector 502 is stored in lane positions 505C and 505D of vector 503. In another example, the value (e.g., 14) in lane position 504C of vector 501 is stored in lane positions 505E and 505F of vector 503. In a further example, the value (e.g., 26) of lane position 506F of vector 502 is stored in lane positions 505G and 505H of vector 503.

In such a condition, where the data in the vectors v0 and v1 are in a different lane position in the generated vector, such as via the result of the rearrange( ) method, the first pattern can be rewritten as the third pattern as discussed below in connection with FIG. 4B.

Returning to FIG. 4A, in conjunction with FIGS. 1-3 and 5, if the location of the destination lane specified by s (structure that holds integer values indicating a destination position of each lane of a vector) is the same location as the lane of the source vector, such as shown in FIG. 5, then, in operation 405, code transformation engine 202 of software transformation system 104 generates a Boolean array for VectorMask m. An illustrative pseudo code to perform such a function by code transformation engine 202 is provided below:

```
boolean[ ] generateMaskForBlend(VectorShuffle s) {
    boolean[ ] b = new boolean[s.length( )];
    for (int i = 0; i < s.length( ); i++) {
        b[i] = (s.laneSource(i) >= 0) ? false : true;
    }
    return b;
}
```

In one embodiment, the Boolean array generated in operation 405 is used to generate the code of the rewriting candidate as discussed below.

In operation 406, code transformation engine 202 of software transformation system 104 executes code to rewrite the first pattern in the program as a second pattern, v0.blend (v1, m), using the Boolean array.

In one embodiment, the second and subsequent arguments of VectorMask.fromValues( ) expand the contents of the Boolean array of the result of operation 405, starting from element 0, to form vector v=v0.blend(v1, m). The Vector-Mask.fromValues( ) method is used to return a mask (data used for bitwise operations) where each lane is set or unset according to given Boolean values. An illustrative pseudo code to rewrite the first pattern in the program as a second pattern, v0.blend(v1, m), using the Boolean array is shown below:

static final VectorMask m=VectorMaskfromValues(SPE-CIES, false, true, false, true, false, true, false, true);

Vector v=v0.blend(v1, m);

In operation 407, evaluator 203 of software transformation engine 104 determines the execution time of the program with the first pattern and the execution time of the program with the second pattern.

As discussed above, in one embodiment, evaluator 203 computes the execution time of the program using the two different patterns (e.g., first pattern and the second pattern) by measuring the program execution time from the program initiation, such as the presentation of inputs, to the termination at the delivery of the last outputs.

In one embodiment, evaluator 203 computes such an execution time using any of the following: the "time" Linux command, <chrono> library, gettimeofday( ) function, clock( ) function, timeit function in MathWorks®, stopwatch timer functions tic and toc in MathWorks®, etc.

In one embodiment, evaluator 203 uses software analyzers for computing the execution time, such as RapiTime, Dynatrace®, etc.

In operation 408, code transformation engine 202 of software transformation system 104 determines whether the execution time of the program using the second pattern is less than the execution time of the program using the first pattern.

If the execution time of the program using the second pattern is less than the execution time of the program using the first pattern, then, in operation 409, code transformation engine 202 of software transformation system 104 replaces the first pattern with the second pattern in the program thereby improving the performance of the program that manipulates two vectors of data using Java® Vector API by improving the execution time of the program.

For example, the first pattern (see "Program 1" in the pseudo code shown below) in the program will be replaced with the second pattern (see "Program 2" in the pseudo code shown below) as shown below in the illustrated pseudo code:

Program 1:

```
import jdk.incubator.vector.*;
static final VectorSpecies<Long>
SPECIES = LongVector.SPECIES__512;
static final VectorShuffle shuffle1 =
    VectorShuffle.fromValues(SPECIES, 0, -7, 2, -5, 4, -3, 6, -1);
void rearrange1a(LongVector v0, LongVector v1, LongVector v) {
    Long Vector v = v0.rearrange(shuffle1, v1);
}
```

Program 2:

```
import jdk.incubator.vector.*;
static final VectorSpecies<Long>
SPECIES = LongVector.SPECIES__512;
static final VectorMask<Long> mask1 =
    VectorMask.fromValues(SPECIES, false, true, false, true,
        false, true, false, true);
void rearrange1b(LongVector v0, LongVector v1, LongVector v) {
    LongVector v = v0.blend(v1, mask1);
}
```

If, however, the execution time of the program using the second pattern is not less than the execution time of the program using the first pattern, then, in operation 410, code transformation engine 202 of software transformation system 104 does not replace the first pattern with the second pattern in the program.

Figure 4B:
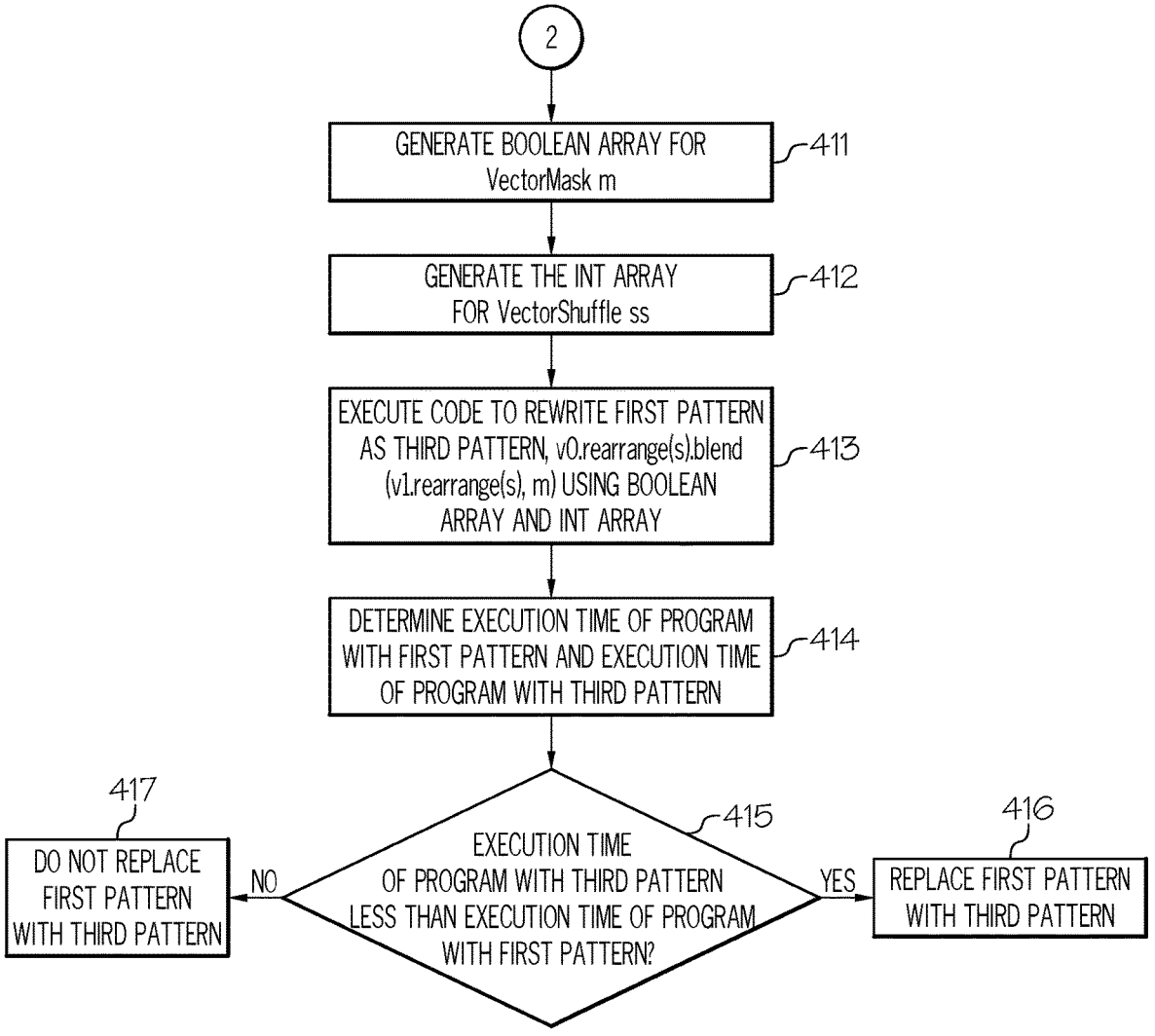

Returning to operation 404, if the location of the destination lane specified by s (structure that holds integer values indicating a destination position of each lane of a vector) is not the same location as the lane of the source vector, such as shown in FIG. 6, then, as shown in FIG. 4B, in conjunction with FIGS. 1-3 and 6, in operation 411, code transformation engine 202 of software transformation system 104 generates a Boolean array for VectorMask m in order to know whether to choose vector v0 (e.g., vector 501) or vector v1 (e.g., vector 502) for each lane in the vector, vector s. An illustrative pseudo code to perform such a function by code transformation engine 202 is provided below:

```
bool[ ] generateMaskForBlend(VectorShuffle s) {
    bool[ ] b = new boolean[s.length( )];
    for (int i = 0; i < s.length( ); i++) {
        b[i] = (s.laneSource(i) >= 0) ? false : true;
    }
    return b;
}
```

In operation 412, code transformation engine 202 of software transformation system 104 generates the int array for VectorShuffle ss to determine the location of the lane to be stored by the vector specified by ss. The VectorShuffle( ) method represents an ordered immutable sequence of int values called source indexes, where each source index numerically selects a source lane from a compatible vector. The object "ss," as used herein, is the same as "s," and is an object of the VectorShuffle class of the jdk.incubator.vector package. Furthermore, "ss" (just like "s") is a structure that holds integer values indicating a destination position of each lane of a vector. An illustrative pseudo code to perform such a function by code transformation engine 202 is provided below:

```
int[ ] generateShuffleForBlend(VectorShuffle s) {
    int[ ] ss = new int[s.length( )];
    for (int i = 0; i < s.length( ); i++) {
        ss[i] = (s.laneSource(i) + s.length( )) % s.length( );
    }
    return ss;
}
```

In operation 413, code transformation engine 202 of software transformation system 104 executes code to rewrite the first pattern as the third pattern, v0.rearrange(s).blend (v1.rearrange(s), m), using the Boolean array (from operation 411) and the int array (from operation 412). In one embodiment, the second and subsequent arguments of VectorMask.fromValues( ) expand the contents of the Boolean array of the result from operation 411, starring from element 0. Furthermore, the second and subsequent arguments of VectorShuffle.fromValues( ) expand the contents of the int array of the result of operation 412, starting from element 0. The VectorShuffle.fromValues( ) method is used to create a shuffle for a given species from a series of source indexes. An illustrative pseudo code to rewrite the first pattern in the program as a third pattern, v0.rearrange(s).blend (v1.rearrange(s), m), using the Boolean array and int array is shown below:
static final VectorShuffle ss=VectorShufflefromValues(SPECIES, 0, 0, 2, 2, 4, 4, 6, 6);
static final VectorMask m=VectorMaskfromValues(SPECIES, false, false, true, true, false, false, true, true);
Vector v=v0.rearrange(ss).blend(v1.rearrange(ss), m);

In operation 414, evaluator 203 of software transformation engine 104 determines the execution time of the program with the first pattern and the execution time of the program with the third pattern.

As discussed above, in one embodiment, evaluator 203 computes the execution time of the program using the two different patterns (e.g., first pattern and the third pattern) by measuring the program execution time from the program initiation, such as the presentation of inputs, to the termination at the delivery of the last outputs.

In one embodiment, evaluator 203 computes such an execution time using any of the following: the "time" Linux command, <chrono> library, gettimeofday( ) function, clock( ) function, timeit function in MathWorks®, stopwatch timer functions tic and toc in MathWorks®, etc.

In one embodiment, evaluator 203 uses software analyzers for computing the execution time, such as RapiTime, Dynatrace®, etc.

In operation 415, code transformation engine 202 of software transformation system 104 determines whether the execution time of the program using the third pattern is less than the execution time of the program using the first pattern.

If the execution time of the program using the third pattern is less than the execution time of the program using the first pattern, then, in operation 416, code transformation engine 202 of software transformation system 104 replaces the first pattern with the third pattern in the program thereby improving the performance of the program that manipulates two vectors of data using Java® Vector API by improving the execution time of the program.

For example, the first pattern (see "Program 1" in the pseudo code shown below) in the program will be replaced with the third pattern (see "Program 2" in the pseudo code shown below) as shown below in the illustrated pseudo code:
Program 1:

```
import jdk.incubator.vector.*;
static final VectorSpecies<Long>
SPECIES = LongVector.SPECIES_512;
static final VectorShuffle<Long> shuffle2a =
    VectorShuffle.from Values(SPECIES, 0, 0, -6, -6, 4, 4, -2, -2);
void rearrange2a(LongVector v0, LongVector v1, Long Vector v) {
    LongVector v = v0.rearrange(shuffle2a, v1);
}
```

Program 2:

```
import jdk.incubator.vector.*;
static final VectorSpecies<Long>
SPECIES = LongVector.SPECIES_512;
static final VectorShuffle<Long> shuffle2b =
    VectorShuffle.from Values(SPECIES, 0, 0, 2, 2, 4, 4, 6, 6);
static final VectorMask<Long> mask2b =
    VectorMask.fromValues(SPECIES, false, false, true, true,
        false, false, true, true);
void rearrange2b(LongVector v0, LongVector v1, LongVector v) {
    LongVector v = v0.rearrange(shuffle2b)
        .blend(v1.rearrange(shuffle2b), mask2b);
}
```

If, however, the execution time of the program using the third pattern is not less than the execution time of the program using the first pattern, then, in operation 417, code transformation engine 202 of software transformation system 104 does not replace the first pattern with the third pattern in the program.

Figure 4C:
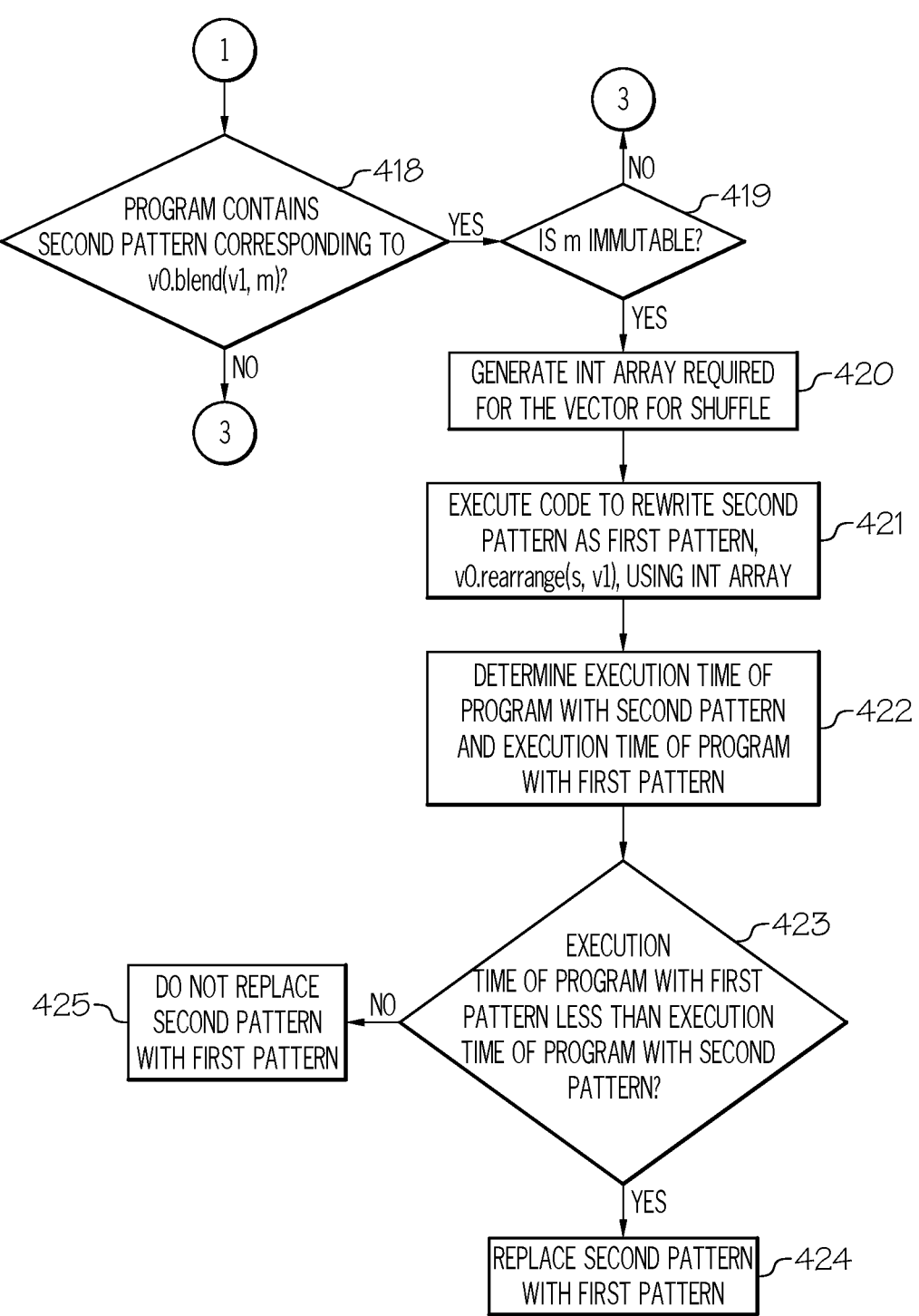

Returning to operations 401 and 402 of FIG. 4A, if pattern identifier 201 does not identify code in the program written as the first pattern (e.g., v0.rearrange(s, v1)) or if s is not immutable, then, referring to FIG. 4C, in conjunction with FIGS. 1-3, in operation 418, pattern identifier 201 of software transformation system 104 determines if the program, such as a program that manipulates two vectors of data using Java® Vector API, contains the second pattern of code corresponding to v0.blend(v1, m), where v0 and v1 are vectors that contain values formed from executing single instruction, multiple data (SIMD) instructions, and where m is a structure that holds Boolean values used to select each lane of a vector. Furthermore, as discussed above, the blend( ) method is used to select the values in the vector lane based on the Boolean value provided as an argument.

Additionally, as discussed above, in one embodiment, v0 and v1 are objects of the Vector class of the jdk.incubator.vector package (package that provides classes to express vector computations that are accelerated using vector hardware instructions). In one embodiment, m is an object of the VectorMask class of the jdk.incubator.vector package.

As stated above, in one embodiment, pattern identifier 201 identifies the patterns of code (e.g., v0.blend(v1, m)) based on having such patterns, including the methods (e.g., rearrange( ), blend( )) and objects (e.g., v0, v1, s, m) of the classes to be identified in such patterns, being populated in a data structure by an expert and used by pattern identifier

201 to locate such patterns in the program (e.g., program for manipulating two vectors of data using Java® Vector API). In one embodiment, such a data structure is stored in a storage device (e.g., storage device 311, 315) of software transformation system 104.

In one embodiment, such a pattern of code (e.g., v0.blend (v1, m)), including the method and objects of the classes in such a pattern, are identified in the program (e.g., program for manipulating two vectors of data using Java® Vector API) using various software tools, including, but not limited to, Whole Platform, Coccinelle, AdaControl, Spoon, etc.

If the second pattern (e.g., v0.blend(v1, m)) is identified in the program, then, in operation 419, code transformation engine 202 of software transformation system 104 determines if m (a structure that holds Boolean values used to select each lane of a vector) is immutable (unchanging over time or unable to be changed).

If m is immutable, then, in operation 420, code transformation engine 202 of software transformation system 104 generates an int array required for the Vector for shuffle. In one embodiment, code transformation engine 202 generates the int array for the Vector for shuffle based on whether the Vector to be read is v0 or v1 as specified by m. An illustrative pseudo code to perform such a function by code transformation engine 202 is provided below:

```
int[ ] generateShuffleFromBlend(VectorMask m) {
    int[ ] s = new int[m.length( )];
    for (int i = 0; i < s.length( ); i++) {
        s[i] = m.laneIsSet(i) ? i – s.length( ) : i;
    }
    return s;
}
```

In one embodiment, the necessary integer values for the argument s of the rearrange( ) method are generated based on the contents of the argument m of the blend( ) method as shown above.

In operation 421, code transformation engine 202 of software transformation system 104 executes code to rewrite the second pattern as the first pattern, v0.rearrange(s, v1), using the int array generated in operation 420. In one embodiment, the second and subsequent arguments of VectorShuffle.fromValues( ) expand the contents of the int array of the result from operation 420, starting from element 0. As discussed above, the VectorShuffle.fromValues( ) method is used to create a shuffle for a given species from a series of source indexes. An illustrative pseudo code to rewrite the second pattern in the program as the first pattern, v0.rearrange(s, v1), using the int array is shown below:
static final VectorShuffle s=VectorShufflefromValues(SPE-CIES, 0, –7, 2, –5, 4, –3, 6, –1); Vector v=v0.rearrange(s, v1);

In operation 422, evaluator 203 of software transformation engine 104 determines the execution time of the program with the second pattern and the execution time of the program with the first pattern.

As discussed above, in one embodiment, evaluator 203 computes the execution time of the program using the two different patterns (e.g., second pattern and the first pattern) by measuring the program execution time from the program initiation, such as the presentation of inputs, to the termination at the delivery of the last outputs.

In one embodiment, evaluator 203 computes such an execution time using any of the following: the "time" Linux command, <chrono> library, gettimeofday( ) function, clock( ) function, timeit function in MathWorks®, stopwatch timer functions tic and toc in MathWorks®, etc.

In one embodiment, evaluator 203 uses software analyzers for computing the execution time, such as RapiTime, Dynatrace®, etc.

In operation 423, code transformation engine 202 of software transformation system 104 determines whether the execution time of the program using the first pattern is less than the execution time of the program using the second pattern.

If the execution time of the program using the first pattern is less than the execution time of the program using the second pattern, then, in operation 424, code transformation engine 202 of software transformation system 104 replaces the second pattern with the first pattern in the program thereby improving the performance of the program that manipulates two vectors of data using Java® Vector API by improving the execution time of the program.

If, however, the execution time of the program using the first pattern is not less than the execution time of the program using the second pattern, then, in operation 425, code transformation engine 202 of software transformation system 104 does not replace the second pattern with the first pattern in the program.

Figure 4D:
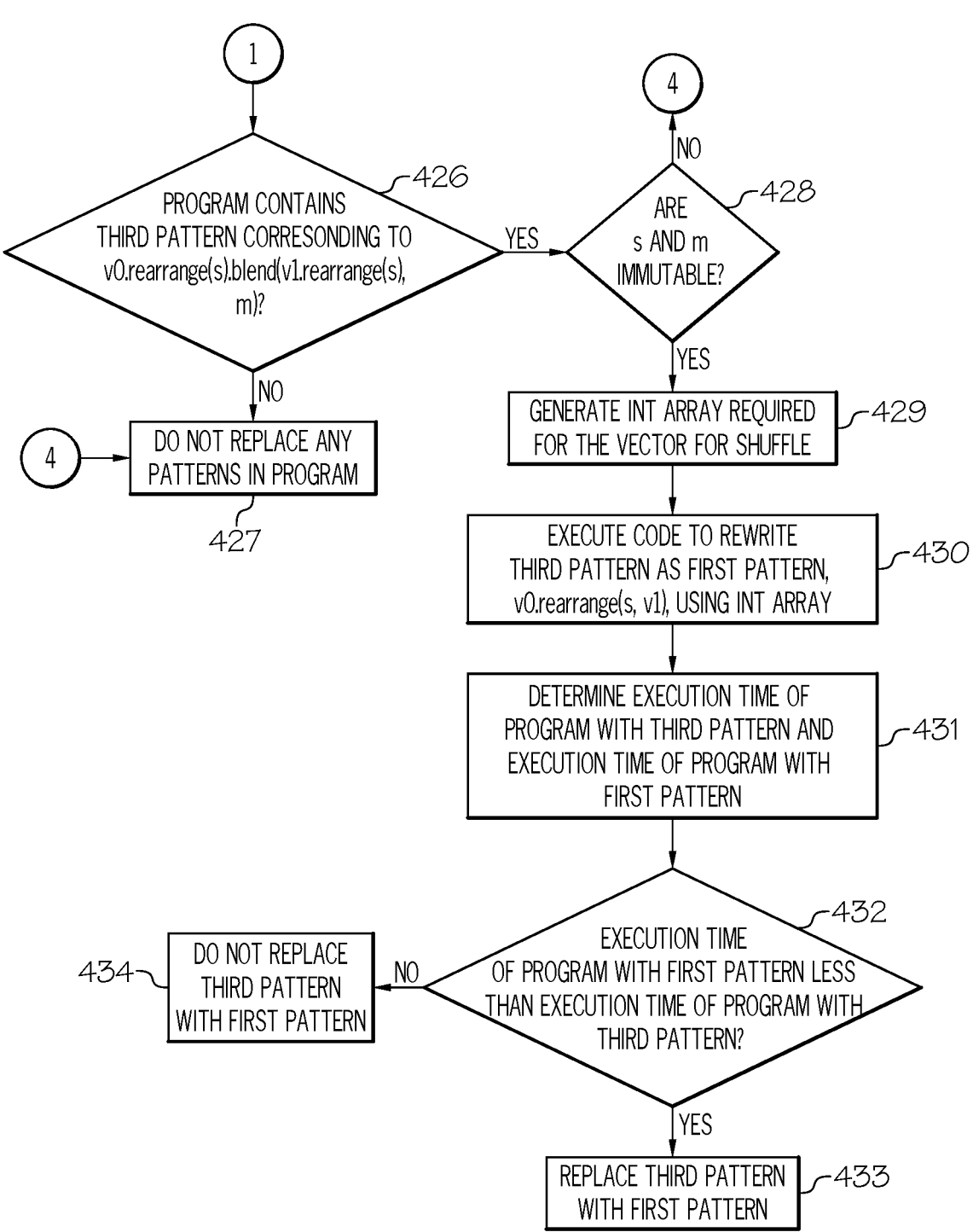

Returning to operations 418 and 419, if pattern identifier 201 does not identify code in the program containing the second pattern (e.g., v0.blend(v1, m)) or if m is not immutable, then, referring to FIG. 4D, in conjunction with FIGS. 1-3, in operation 426, pattern identifier 201 of software transformation system 104 determines if the program, such as a program that manipulates two vectors of data using Java® Vector API, contains the third pattern of code corresponding to v0.rearrange(s).blend(v1.rearrange(s), m), where v0 and v1 are vectors that contain values formed from executing single instruction, multiple data (SIMD) instructions, where s is a structure that holds integer values indicating a destination position of each lane of a vector and where m is a structure that holds Boolean values used to select each lane of a vector. Furthermore, as discussed above, the rearrange( ) method moves values in a location of a vector lane based on a numerical value given as an argument. Additionally, as discussed above, the blend( ) method selects the values in the vector lane based on the Boolean value provided as an argument.

Additionally, as discussed above, in one embodiment, v0 and v1 are objects of the Vector class of the jdk.incubator.vector package (package that provides classes to express vector computations that are accelerated using vector hardware instructions). In one embodiment, s is an object of the VectorShuffle class of the jdk.incubator.vector package. In one embodiment, m is an object of the VectorMask class of the jdk.incubator.vector package.

As stated above, in one embodiment, pattern identifier 201 identifies the patterns of code (e.g., v0.rearrange(s) .blend(v1.rearrange(s), m)) based on having such patterns, including the methods (e.g., rearrange( ), blend( )) and objects (e.g., v0, v1, s, m) of the classes to be identified in such patterns, being populated in a data structure by an expert and used by pattern identifier 201 to locate such patterns in the program (e.g., program for manipulating two vectors of data using Java® Vector API). In one embodiment, such a data structure is stored in a storage device (e.g., storage device 311, 315) of software transformation system 104.

In one embodiment, such a pattern of code (e.g., v0.rearrange(s).blend(v1.rearrange(s), m)), including the methods and objects of the classes in such a pattern, are identified in the program (e.g., program for manipulating two vectors of data using Java® Vector API) using various software tools, including, but not limited to, Whole Platform, Coccinelle, AdaControl, Spoon, etc.

If pattern identifier 201 does not identify the third pattern of code corresponding to v0.rearrange(s).blend(v1.rearrange (s), m) in the program, then, in operation 427, code transformation engine 202 of software transformation system 104 does not replace any patterns of code in the program.

If, however, pattern identifier 201 identifies the third pattern of code corresponding to v0.rearrange(s).blend (v1.rearrange(s), m) in the program, then, in operation 428, code transformation engine 202 of software transformation system 104 determines if s (structure that holds integer values indicating a destination position of each lane of a vector) and m (structure that holds Boolean values used to select each lane of a vector) are immutable (unchanging over time or unable to be changed). If s and m are not immutable, then, in operation 427, code transformation engine 202 of software transformation system 104 does not replace any patterns of code in the program.

If, however, s and m are immutable, then, in operation 429, code transformation engine 202 of software transformation system 104 generates an int array required for the Vector for shuffle. In one embodiment, code transformation engine 202 generates the int array for the Vector for shuffle based on whether the Vector to be read is v0 or v1 as specified by m and the destination lane as specified by s. An illustrative pseudo code to perform such a function by code transformation engine 202 is provided below:

```
int[ ] generateShuffleFromBlend(VectorMask m, VectorShuffle s) {
    int[ ] ss = new int[s.length( )];
    for (int i = 0; i < s.length( ); i++) {
        ss[i] = m.laneIsSet(i) ? s.laneSource(i) – s.length( ) : s;
    }
    return ss;
}
```

In one embodiment, the necessary integer values for the argument ss of the rearrange( ) method are generated based on the contents of the argument m of the blend( ) method and the argument s of the rearrange( ) method as shown above.

In operation 430, code transformation engine 202 of software transformation system 104 executes code to rewrite the third pattern as the first pattern, v0.rearrange(s, v1), using the int array generated in operation 429. In one embodiment, the second and subsequent arguments of VectorShuffle.fromValues( ) expand the contents of the int array of the result from operation 429, starting from element 0. As discussed above, the VectorShuffle.fromValues( ) method is used to create a shuffle for a given species from a series of source indexes. An illustrative pseudo code to rewrite the third pattern in the program as the first pattern, v0.rearrange (s, v1), using the int array is shown below:
static final VectorShuffle ss=VectorShufflefromValues(SPECIES, 0, 0, –6, –6, 4, 4, –2, –2);
Vector v=v0.rearrange(ss, v1);

In operation 431, evaluator 203 of software transformation engine 104 determines the execution time of the program with the third pattern and the execution time of the program with the first pattern.

As discussed above, in one embodiment, evaluator 203 computes the execution time of the program using the two different patterns (e.g., third pattern and the first pattern) by measuring the program execution time from the program initiation, such as the presentation of inputs, to the termination at the delivery of the last outputs.

In one embodiment, evaluator 203 computes such an execution time using any of the following: the "time" Linux command, <chrono> library, gettimeofday( ) function, clock( ) function, timeit function in MathWorks®, stopwatch timer functions tic and toc in MathWorks®, etc.

In one embodiment, evaluator 203 uses software analyzers for computing the execution time, such as RapiTime, Dynatrace®, etc.

In operation 432, code transformation engine 202 of software transformation system 104 determines whether the execution time of the program using the first pattern is less than the execution time of the program using the third pattern.

If the execution time of the program using the first pattern is less than the execution time of the program using the third pattern, then, in operation 433, code transformation engine 202 of software transformation system 104 replaces the third pattern with the first pattern in the program thereby improving the performance of the program that manipulates two vectors of data using Java® Vector API by improving the execution time of the program.

If, however, the execution time of the program using the first pattern is not less than the execution time of the program using the third pattern, then, in operation 434, code transformation engine 202 of software transformation system 104 does not replace the third pattern with the first pattern in the program.

As a result of the foregoing, the runtime performance of a program that manipulates vector data using Java® Vector API is greatly improved. The runtime performance of such a program is improved by replacing a pattern(s) of code in the program (e.g., utilize the blend( ) method as opposed to the rearrange( ) method) if such a replacement would improve the execution time of the program.

Furthermore, as a result of the foregoing, the performance of the program using Vector API in Java® is improved without the programmer having to rewrite the code. In fact, the performance of the program using Vector API in Java® is improved without the programmer having knowledge of the implementation of the Java® runtime environment as embodiments of the present disclosure can automatically improve performance when such performance can be improved (i.e., when the execution time of the program can be improved).

Furthermore, the principles of the present disclosure improve the technology or technical field involving software code development.

As discussed above, the Java® programming language used by software programmers (coding professionals) and software developers (writes, manages and debugs the code in computer programs) for software development has recently introduced the Java® Vector API. The Java® Vector API provides an abstraction layer to data-parallel capabilities of modem CPUs. The Vector API tries to enable software developers to write data-parallel software in a very platform-agnostic way. In contrast to a regular computing operation, as in 1+1, Where two "pieces of data" are added in one operation, a data-parallel operation is executing a simple operation (e.g., +) on multiple "pieces of data" at the same time. This mode of operation is called single instruction, multiple data (SIMD), whereas, the traditional way of execution is called single instruction, single data (SISD). The performance speed-up results from applying the same operation on more than one "piece of data" within one CPU cycle. As a simple example, instead of adding each element of an array A with each element of an array B, chunks of array A and array B may be operated simultaneously. Unfortunately, when software programmers or software developers write programs using Vector API, the expected performance may not be achieved. For example, when manipulating vector data, such as moving data across lane boundaries, a slow execution time may result. For instance, a vector is divided into lanes and each lane contains a data value called an element. The rearrange( ) family of methods in Java® selects an arbitrary set of VLENGTH (length of vector) lanes from the input vector(s) and assembles them in an arbitrary order. However, the use of the rearrange( ) method to move data across lane boundaries may result in a slow execution time of the program. Unfortunately, there is not currently a means for improving the execution time of programs manipulating vector data using Java® Vector API, such as programs using the rearrange( ) method to move data across lane boundaries.

Embodiments of the present disclosure improve such technology by determining whether the program contains one of the following patterns: a first pattern corresponding to v0.rearrange(s, v1); a second pattern corresponding to v0.blend(v1, m); and a third pattern corresponding to v0.rearrange(s).blend(v1.rearrange(s), m), where v0 and v1 are vectors, where s is a structure that holds integer values indicating a destination position of each lane of a vector, and where m is a structure that holds Boolean values used to select each lane of a vector. Furthermore, the rearrange( ) method is used to move values in a location of a vector lane based on a numerical value given as an argument. Additionally, the blend( ) method is used to select the values in the vector lane based on the Boolean value provided as an argument. Upon identifying code written as the first pattern in the program, the first pattern is rewritten as the second or third pattern. The first pattern of the program is then replaced with the second or third pattern if the execution time of the program with the second or third pattern is less than the execution time of the program with the first program. Furthermore, upon identifying code written as the second pattern in the program, the second pattern is rewritten as the first pattern. The second pattern of the program is then replaced with the first pattern if the execution time of the program with the first pattern is less than the execution time of the program with the second program. Additionally, upon identifying code written as the third pattern in the program, the third pattern is rewritten as the first pattern. The third pattern of the program is then replaced with the first pattern if the execution time of the program with the first pattern is less than the execution time of the program with the third program. In this manner, the performance of a program that manipulates vector data using Java® Vector API is improved by automatically replacing a pattern(s) of code in the program (e.g., utilize the blend( ) method as opposed to the rearrange( ) method) if such a replacement would improve the execution time of the program. Furthermore, in this manner, there is an improvement in the technical field involving software code development.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving performance of a program that manipulates two vectors of data, the method comprising:

determining whether a program contains one of the following patterns: a first pattern comprising a rearrange( ) method; a second pattern comprising a blend( ) method; and a third pattern comprising both said rearrange( ) method and said blend( ) method wherein said rearrange( ) method moves values in a location of a vector lane based on a numerical value given as an argument, wherein said blend( ) method selects values in a vector lane based on a Boolean value given as an argument;

rewriting said first pattern in said program to one of said second and third patterns in response to identifying code written as said first pattern in said program;

evaluating, by a processor, an execution time of said program written with said first pattern and an execution time of said program written with one of said second and third patterns; and outputting, by said processor, a replacement of said first pattern of said program with one of said second and third patterns in code of said program stored in a memory in response to said processor determining said execution time of said program written with one of said second and third patterns being less than said execution time of said program written with said first pattern thereby improving performance of said program.

2. The method as recited in claim 1 further comprising:

rewriting said second pattern of said program to said first pattern in response to identifying code written as said second pattern in said program; and replacing said second pattern of said program with said first pattern in response to an execution time of said program written with said first pattern being less than an execution time of said program written with said second pattern.

3. The method as recited in claim 2, wherein integer values for said argument s of said rearrange( ) method are generated based on contents of said argument m of said blend( ) method.

4. The method as recited in claim 1 further comprising:

rewriting said third pattern of said program to said first pattern in response to identifying code written as said third pattern in said program; and replacing said third pattern of said program with said first pattern in response to an execution time of said program written with said first pattern being less than an execution time of said program written with said third pattern.

5. The method as recited in claim 1, wherein said first pattern of said program is rewritten as said second pattern in response to having data in vectors v0 and v1 being in a same lane position in a vector generated as a result of said rearrange( ) method.

6. The method as recited in claim 1, wherein said first pattern of said program is rewritten as said third pattern in response to having data in vectors v0 and v1 being in a different lane position in a vector generated as a result of said rearrange( ) method.

7. The method as recited in claim 5, wherein said v0 and v1 are vectors that contain values formed from executing single instruction, multiple data (SIMD) instructions.

8. A computer program product for improving performance of a program that manipulates two vectors of data, the computer program product comprising one or more computer readable storage mediums having program code embodied therewith, the program code comprising programming instructions for:

determining whether a program contains one of the following patterns: a first pattern comprising a rearrange( ) method; a second pattern comprising a blend( ) method; and a third pattern comprising both said rearrange( ) method and said blend( ) method wherein said rearrange( ) method moves values in a location of a vector lane based on a numerical value given as an argument, wherein said blend( ) method selects values in a vector lane based on a Boolean value given as an argument;

rewriting said first pattern in said program to one of said second and third patterns in response to identifying code written as said first pattern in said program;

evaluating, by a processor, an execution time of said program written with said first pattern and an execution time of said program written with one of said second and third patterns; and outputting, by said processor, a replacement of said first pattern of said program with one of said second and third patterns in code of said program stored in a memory in response to said processor determining said execution time of said program written with one of said second and third patterns being less than said execution time of said program written with said first pattern thereby improving performance of said program.

9. The computer program product as recited in claim 8, wherein the program code further comprises the programming instructions for:

rewriting said second pattern of said program to said first pattern in response to identifying code written as said second pattern in said program; and replacing said second pattern of said program with said first pattern in response to an execution time of said program written with said first pattern being less than an execution time of said program written with said second pattern.

10. The computer program product as recited in claim 9, wherein integer values for said argument s of said rearrange( ) method are generated based on contents of said argument m of said blend( ) method.

11. The computer program product as recited in claim 8, wherein the program code further comprises the programming instructions for:

rewriting said third pattern of said program to said first pattern in response to identifying code written as said third pattern in said program; and replacing said third pattern of said program with said first pattern in response to an execution time of said program written with said first pattern being less than an execution time of said program written with said third pattern.

12. The computer program product as recited in claim 8, wherein said first pattern of said program is rewritten as said second pattern in response to having data in vectors v0 and v1 being in a same lane position in a vector generated as a result of said rearrange( ) method.

13. The computer program product as recited in claim 8, wherein said first pattern of said program is rewritten as said third pattern in response to having data in vectors v0 and v1 being in a different lane position in a vector generated as a result of said rearrange( ) method.

14. The computer program product as recited in claim 12, wherein said v0 and v1 are vectors that contain values formed from executing single instruction, multiple data (SIMD) instructions.

15. A system, comprising:

a memory for storing a computer program for improving performance of a program that manipulates two vectors of data; and a processor connected to said memory, wherein said processor is configured to execute program instructions of the computer program comprising:

determining whether a program contains one of the following patterns: a first pattern comprising a rearrange( ) method; a second pattern comprising a blend( ) method; and a third pattern comprising both said rearrange( ) method and said blend( ) method wherein said rearrange( ) method moves values in a location of a vector lane based on a numerical value given as an argument, wherein said blend( ) method selects values in a vector lane based on a Boolean value given as an argument;

rewriting said first pattern in said program to one of said second and third patterns in response to identifying code written as said first pattern in said program;

evaluating, by said processor, an execution time of said program written with said first pattern and an execution time of said program written with one of said second and third patterns; and outputting, by said processor, a replacement of said first pattern of said program with one of said second and third patterns in code of said program stored in said memory in response to said processor determining said execution time of said program written with one of said second and third patterns being less than said execution time of said program written with said first pattern thereby improving performance of said program.

16. The system as recited in claim 15, wherein the program instructions of the computer program further comprise:

rewriting said second pattern of said program to said first pattern in response to identifying code written as said second pattern in said program; and replacing said second pattern of said program with said first pattern in response to an execution time of said program written with said first pattern being less than an execution time of said program written with said second pattern.

17. The system as recited in claim 16, wherein integer values for said argument s of said rearrange( ) method are generated based on contents of said argument m of said blend( ) method.

18. The system as recited in claim 15, wherein the program instructions of the computer program further comprise:

rewriting said third pattern of said program to said first pattern in response to identifying code written as said third pattern in said program; and replacing said third pattern of said program with said first pattern in response to an execution time of said program written with said first pattern being less than an execution time of said program written with said third pattern.

19. The system as recited in claim 15, wherein said first pattern of said program is rewritten as said second pattern in response to having data in vectors v0 and v1 being in a same lane position in a vector generated as a result of said rearrange( ) method.

20. The system as recited in claim 15, wherein said first pattern of said program is rewritten as said third pattern in response to having data in vectors v0 and v1 being in a different lane position in a vector generated as a result of said rearrange( ) method.

* * * * *